United States Patent [19]

Iwamura et al.

[11] Patent Number: 4,868,815
[45] Date of Patent: Sep. 19, 1989

[54] POWER TRANSMISSION SYSTEM

[75] Inventors: Soichi Iwamura, Fuchu; Mitsuhiro Suga, Abiko; Tadashi Itsumi, Kashiwa, all of Japan

[73] Assignee: Sharp Kabushiki Kaisha, Osaka, Japan

[21] Appl. No.: 55,439

[22] Filed: May 29, 1987

[30] Foreign Application Priority Data

Dec. 19, 1986 [JP] Japan .................................. 61-304813
Dec. 19, 1986 [JP] Japan .................................. 61-304814

[51] Int. Cl.$^4$ .............................................. H04J 1/20
[52] U.S. Cl. ..................................... 370/71; 370/122; 328/173; 323/313
[58] Field of Search ................... 370/71, 73, 69.1, 122, 370/74; 340/310 A, 310 R; 328/172, 173; 323/313

[56] References Cited

U.S. PATENT DOCUMENTS

| | | | |
|---|---|---|---|
| 2,510,046 | 5/1950 | Ellett et al. | 370/73 |
| 3,786,190 | 1/1974 | Pori | 370/122 |
| 4,048,551 | 9/1977 | Bosik | 370/71 |
| 4,689,605 | 8/1987 | Laue | 340/310 A |

OTHER PUBLICATIONS

T. N. Rao, "Analog Loop Carrier Systems", Apr. 1978, The Bell System Technical Journal, vol. 57, No. 4, pp. 1109–1128.

Primary Examiner—Douglas W. Olms
Attorney, Agent, or Firm—Birch, Stewart, Kolasch & Birch

[57] ABSTRACT

A power transmission system in which a power sending terminal is connected to a power receiving terminal via a communication cable made of a pair of parallel PVC-coated solid or stranded wires, the power sending terminal superposing DC-power on multiplex signals and transmitting the DC superposed multiplex signals through the communication cable to the power receiving terminal where DC power is separated from the multiplex signals to operate remote equipments.

10 Claims, 6 Drawing Sheets

POWER TRANSMISSION SYSTEM

BACKGROUND OF THE INVENTION

The present invention relates to a method for audio video signals' multiplexed transmission system using a interphone cable made of a pair of parallel PVC-coated wires.

Interphone whose power consumption is relatively small usually uses dry cells as the driving power source. When a TV door phone system is used in place of the existing interphone, however, the door phone camera in the outdoor unit cannot be driven by the dry cell provided for supplying power to the interphone, because the camera requires larger power. Moreover, when replacing the interphone with the TV door phone, it is necessary to newly install another power cable for driving the door phone camera and a co-axial cable for video signal transmission, resulting in extra installation cost. For the purpose of saving power-supply cables there is already known a method that with a co-axial cable for video signal transmission DC power may be transmitted, superposed on video signals by mean of series regulators for duplexing of DC power with a video signal at the sending terminal and for de-duplexing at the receiving terminal. In general, spectra of both audio and video signals include such low-frequency components as 100 Hz at least, so that power choke coils are necessary for DC power duplexing but these are too heavy, bulky and power-dissipative to compcatly fabricate the indoor or outdoor unit.

Summary of the Invention

In view of the above, an object of the present invention is to provide a DC power-superposed miltiplex transmission system using a telephone communication cable, which is capable to transmit simultaneous two-way or one-way video signals and simultaneous two-way audio and/or control (audio/control) signals along with one-way DC power transmission. By facilitating to divert from the already installed cable for interphone to that for a TV door phone system, this system can save the extra cost of new cable installation.

Another object of the present invention is to provide a power transmission system in which DC power is multiplexed by a series regulator of constant current type in sending end with such audio signals in low-frequency band and with such carriers of video signal in high-frequency band, transmitted along with those through a telephone communication cable and demultiplexed from those at the receiving end of the outdoor unit by the regulator similar to the sending end.

Here, output impedance of the series regulator of a constant current type at sending end (hereinafter, this regulator will be refered to simply as "sending regulator") and that of the similar regulator at receiving end (hereinafter, this regulator will be referred to simply as "receiving regulator") are necessary to be high enough, compared with the cable's characteristic impedance within such a wide range as to 10 MHz.

Another objects of the present invention is to provide DC power-superposed multiplexed transmission system in which DC power is multiplexed by choke coils of small type with such carriers of audio/control signals, that is, such audio/control carriers in medium-frequency band and with such carriers of video signals, that is, such video carriers in high-frequency band, transmitted along with those through a telephone communication cable and separated from those at the receiving terminal of the outdoor unit.

Another object of the present invention is to provide a power transmission system which remotely controls the DC voltage at the power-receiving terminal of the outdoor unit using a multiplexed control signal to keep the DC voltage specified regardless of the cable length.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to a first embodiment of the present invention, a power transmission system in which DC power is superposed on audio signals and video carriers, transmitted through the telephone communication cable, is constructed, comprising said sending regulator, said receiving regulator and a conversion regulator which operates as a buffer to the following regulator of constant voltage type to drive CCD camera, frequency-modulator of video signals and its processors.

Here, the telephone communication cable is not only limited to an inhouse cable (for example, a interphone cable composed of a pair of parallel or twisted solid wires each having a diameter of 0.5 mm and coated with poly-vivyl chloride, i.e., PVC), but also for interphone it includes a pair of parallel vinyl lines generally used to AC power supply (composed of a pair of stranded wires (20/0.18 or 30/0.18)). Hereinafter any of the above-mentioned communication cables will be referred to simply as cable.

To achieve the above objects, according to a second embodiment of the present invention, the DC power-superposed multiplex transmission system is constructed, comprising frequency-modulators means mounted in both the power sending and receiving ends to modulate each specified carrier with each audio/control and video signal, and power choke coils instead of said series regulators mounted at both the power sending and receiving terminals, which have such inductance as to turn into high inpendance at said specified carrier frequency, compared with the cable's characteristic impedance to prevent the carriers except DC component from short-circuiting.

A balanced cable transmission system using said audio/control and video carriers is compactly constructed in which it is able to easily transmit DC power by means of the bridge circuit with choke coils of small type. In order to construct the balanced cable transmission system a line transformer is needed at each cable-termination for inputting and/or outputting audio/control and video carriers.

To achieve the above objects, according to a third embodiment of the present invention, the power transmission system is constructed, comprising a frequency-modulator of a control carrier with the DC voltage drop at the receiving terminal mounted in the power-receiving end in order to feed back the control carrier to the power-sending end through the cable, and a frequency-demodulator of the control carrier into the "DC drop" control signal means provided in the power sending end in order to regulate the supply voltage by a regulator to keep constant the DC voltage at the power receiving terminal regardless of difference of the cable length.

There is another method of compensation of DC voltage drop in which the sending regulator of constant current type keeps equal to the DC current enough to be feeded to the outdoor unit. In the balanced cable transmission using the above-mentioned bridge circuit with choke coils, the output impedance of the series regulator is not necessary to keep high within a whole spectrum range of carrier transmission. Therefore, by the series regulator of a constant current type the DC voltage at receiving terminal of the outdoor unit can be easily kept to a specified value, detecting the DC current returned back into the indoor unit.

BRIEF DESCRIPTION OF DRAWINGS

The present invention will become fully understood from the detailed description given hereinbelow and the accompanying drawings which are given by way of illustration only, and thus are not limitative of the present invention and wherein.

DETAILED DESCRIPTION OF THE INVENTION

A power transmission system of the first embodiment of the present invention is described below with reference to FIGS. 1 through 4.

Figure 1:
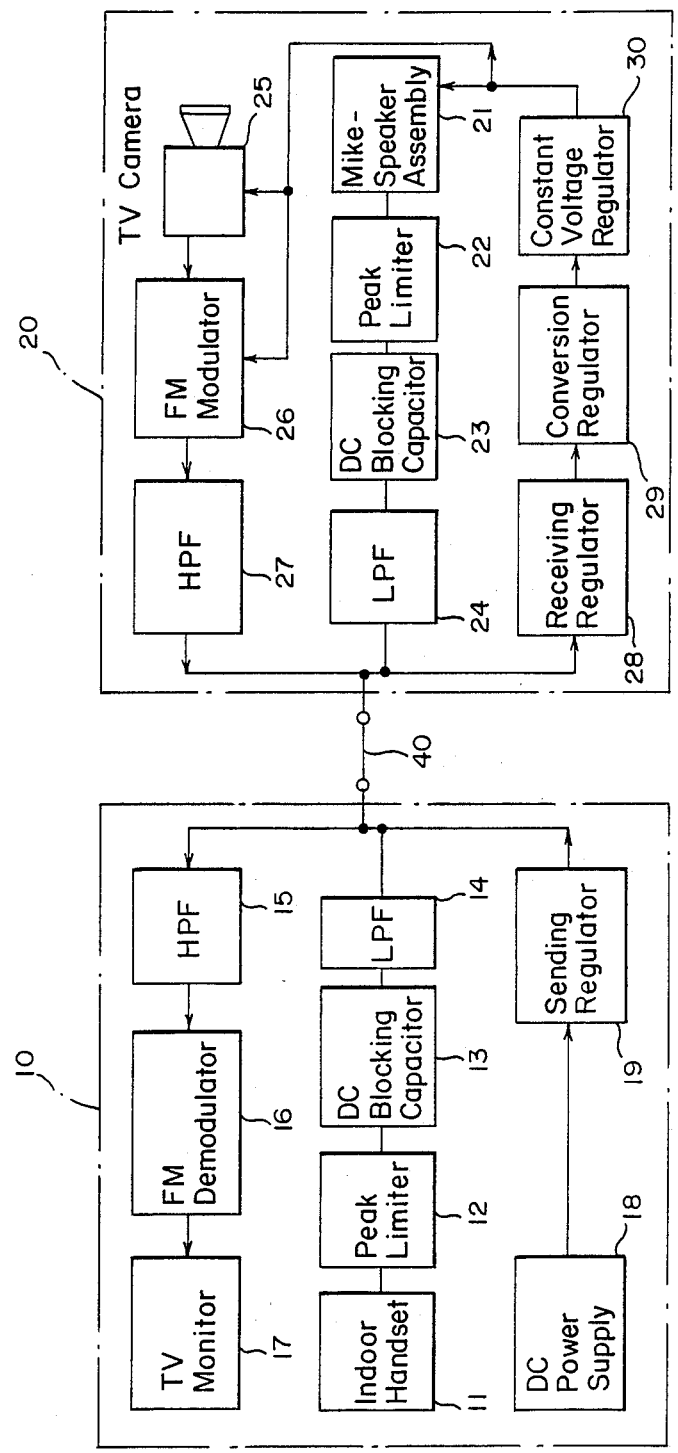
FIG. 1 is a block diagram schematically showing the construction of the first embodiment of the invention.
Figure 2:
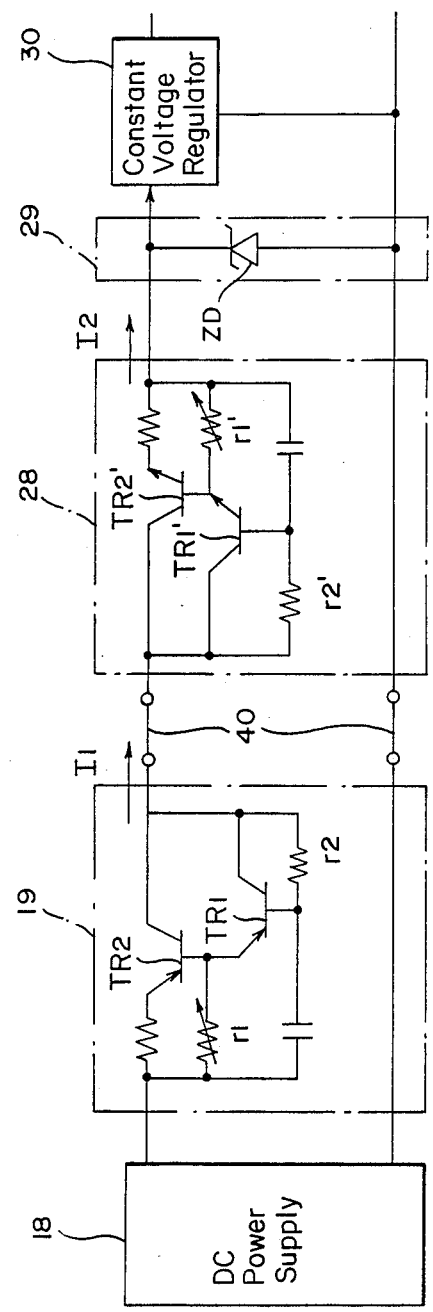
FIG. 2 is a specific circuit diagram of the constant current regulator in FIG. 1.

FIG. 1 is a block diagram of a power transmission system of the first embodiment of the present invention. FIG. 2 shows a typical circuit making up the constant current regulator of FIG. 1. Referring to FIGS. 1 and 2, 10 is a indoor unit and 20 is a outdoor unit of the TV door phone system. 40 is the said cable for connection between the indoor unit 10 and the outdoor unit 20.

The indoor unit 10 comprises an audio signal processing block, a video signal processing block and a power supply block. The audio signal processing block comprises a indoor handset 11, an audio signal's peak-limiter 12, a DC-blocking capacitor 13 and a lowpass filter (LPF) 14. The video signal processing block comprises a highpass filter (HPF) 15, a frequency-demodulator 16 (including a limiter) and a TV monitor 17. The power supply block comprises a DC power supply 18 and a first constant current regulator (said sending regulator) 19.

The outdoor unit 20 comprises an audio signal processing block, a video signal processing block and a power receiving block. The audio signal processing block comprises a mike/speaker outdoor assembly 21, an audio signal's peak-limiter 22, a DC-blocking capacitor 23 and a lowpass filter (LPF) 24. The video signal processing block comprises a TV camera 25, a frequency-modulator 26 and a highpass filter (HPF) 27. The power receiving block comprises a second constant current regulator (said receiving regulator) 28, a current-voltage conversion regulator (said conversion regulator) 29 and a constant voltage regulator 30. This regulator 30 drives the TV camera 25, the frequency-modulator 20 and the other processors and need not always be included in the construction. A typical cable widely used of said cable 40 composes of a pair of PVC-coated parallel solid-wires of 0.5 mm in each diameter and its transmission characteristics of 100 m in span show an attenuation of 6 dB at 10 MHz.

As shown in detail in FIG. 2, for example, said sending regulator 19 comprises PNP transistors $TR_1$ and $TR_2$ of Darlington connection, and said receiving regulator 28 comprises NPN transistors $TR_{1'}$ and $TR_{2'}$ of Darlington connection. The sending and receiving regulators 19 and 28 constitute complementary regulators. The constant current outputs $I_1$ and $I_2$ of the regulators 19 and 28 are set at the same value through fine adjustment of the variable resistors $r_1$ and $r_1'$ included in the regulators 19 and 28, respectively. Resistors $r_2$ and $r_2'$ supply base current to the initial stage transistors $TR_1$ and $TR_1'$ of Darlington connection in the regulators 19 and 28, respectively. The resistors $r_2$ and $r_2'$ are desirably set such impedance higher than the cable characteristic impedance within from the audio base-band to the frequency-modulated video carrier band or numerically 200 ohms at least so as not to cause more than 3 dB of attenuation of the transmitted audio signal and video carrier.

The said conversion regulator 29 connected with the said receiving regulator 28 comprises a zener diode "ZD". Part of the current output $I_2$ from the receiving regulator 28 is allowed to overflow into the Zener diode "ZD" to stabilize the operation of the following regulator of constant current type 30.

Figure 3:
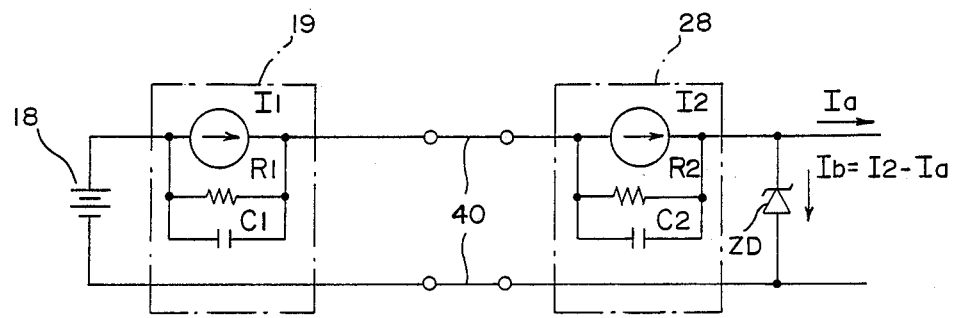
FIG. 3 is an equivalent circuit of the constant current regulator.

FIG. 3 is an equivalent circuit diagram of the constant current regulators shown in FIG. 2. The said sending regulators 19 comprises a constant current source $I_1$ and internal impedance $R_1$ and $C_1$. The receiving regulator 28 comprises $R_2$ and $C_2$. Assuming the current supplied to the following constant voltage regulator 30 is $I_a$, the current overflowing into the Zener diode ZD, $I_b$, is expressed as $I_b = I_2 - I_a$.

In order that the internal impedances $R_1$, $R_2$, $C_1$ and $C_2$ of the constant current regulators 19 and 28 may not shunt the cable impedance, those impedance are desirably set fairly larger than the characteristic impedance of the said cable 40. The characteristic impedance of a pair of PVC-coated parallel solid-wires of 0.5 mm in each diameter is measured as about 180 ohms. Therefore, the equivalent resistors $R_1$ and $R_2$ larger than 1000 ohms are easily achieved by selecting an appropriate power transistors suitable for the constant current regulators 19 and 28. The capacitors $C_1$ and $C_2$ result mainly from the collector-base capacitance $C_{cb}$ of the power transistor for the series regulator, and shunt the termination resistances (about 180 ohms) within the video carrier band. If the collector-base capacitance $C_{cb}$ becomes large, therefore, reflection at the higher frequency component of the video carrier increases, resulting in deteriorated transmission chracteristics. Considering this fact, transistors for the series regulators should have a small collector-base capacitance $C_{cb}$ which depends on the collector-base voltage. It is desirable, therefore, to select a optimal collector-emitter voltage with due regard to power dissipation for the system.

Operation of the above embodiments of the present invention is described in the following.

The constant current output $I_1$ from the sending regulator 19 is transmitted, superposed on the audio signal sent from the indoor unit 10, through the cable 40 to the outdoor unit 20. Receiving the constant current output $I_1$, the receiving regulator 28 outputs constant current $I_2$ of the same magnitude as the constant current $I_1$. The constant current $I_2$ is supplied to the conversion regulator 29 and to the constant voltage regulator 30 which outputs constant voltage for actuating the TV camera 25, etc.

The audio signal is baseband-transmitted in both ways between the indoor unit 10 and the outdoor unit 20 by the respective audio signal processing blocks. At this time, the DC blocking capacitors 13 and 23 eliminate DC component from the audio signal, and the lowpass filters 14 and 24 restrict the audio signal band within 10 kHz or lower. Meanwhile, a carrier is modulated with the video signal outputted from the TV camera 25 by the frequency-modulator 26 which disperses the carrier spectrum within from 1.5 MHz to 10 MHz. After passing through the highpass filter 27, the video carier is superposed on the audio signal and transmitted from the outdoor unit 20 to the indoor unit 10.

Since the audio signal and the video carrier are separated by these spectrum band, there is no cross-talk. The audio signal whose spectrum band's upper limit is not higher than about 10 kHz is transmitted without virtually no attenuation through the cable 40.

The Multiplex signals composed of an audio signal and a video carrier are separated into the audio signal and the video carrier by the lowpass filter 14 and the highpass filter 15 in the indoor unit 10. The video carrier is then demodulated by the frequency-demodulator 16 into the video signal which is supplied to the TV monitor 17.

Inputting an audio signal with a large swing results in short-circuiting of the collector-emitter voltage of the transistor for the constant current regulator 19 or 28, causing the video carrier superposed on a peak swing of the audio signal to be for the moment attenuated to interrupt video reproduction. To avoid this trouble, according to the present invention, the audio signal's peak limiters 12 and 22 are provided in the indoor unit 10 and the outdoor unit 20, respectively, as shown in FIG. 1.

Figure 4:
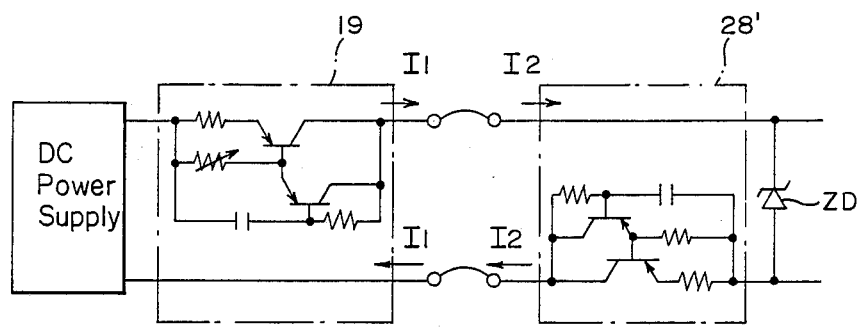
FIG. 4 is a block diagram schematically showing another construction of the first embodiment of the present invention.

In the above first embodiment, the constant current regulators 19 and 28 may be connected to either terminal of the cable 40. Alternatively, as shown in FIG. 4, the constant current regulator at the power receiving terminal (in the outdoor unit 20) may be connected to the earth return side of the cable. With this alternative construction, transistors of the similar type (PNP type) may be used for the sending regulator 19 and for the receiving regulator 28. The DC resistance of the cable increases in proportion to the cable length. According to the present invention, if the cable resistance is 10 ohms and the cable DC current is 0.5 A, for instance, the cable DC drop of 5 V can be compensated by raising up by 5 V the DC supply voltage of the power sending terminal. Thus, it is possible to supply DC power from the indoor unit to the outdoor unit of several 100 m away. In the above embodiment, the invention is applied to a door phone camera system. Not to mention, the present invention is also applicable to a TV telephone system.

Figure 5:
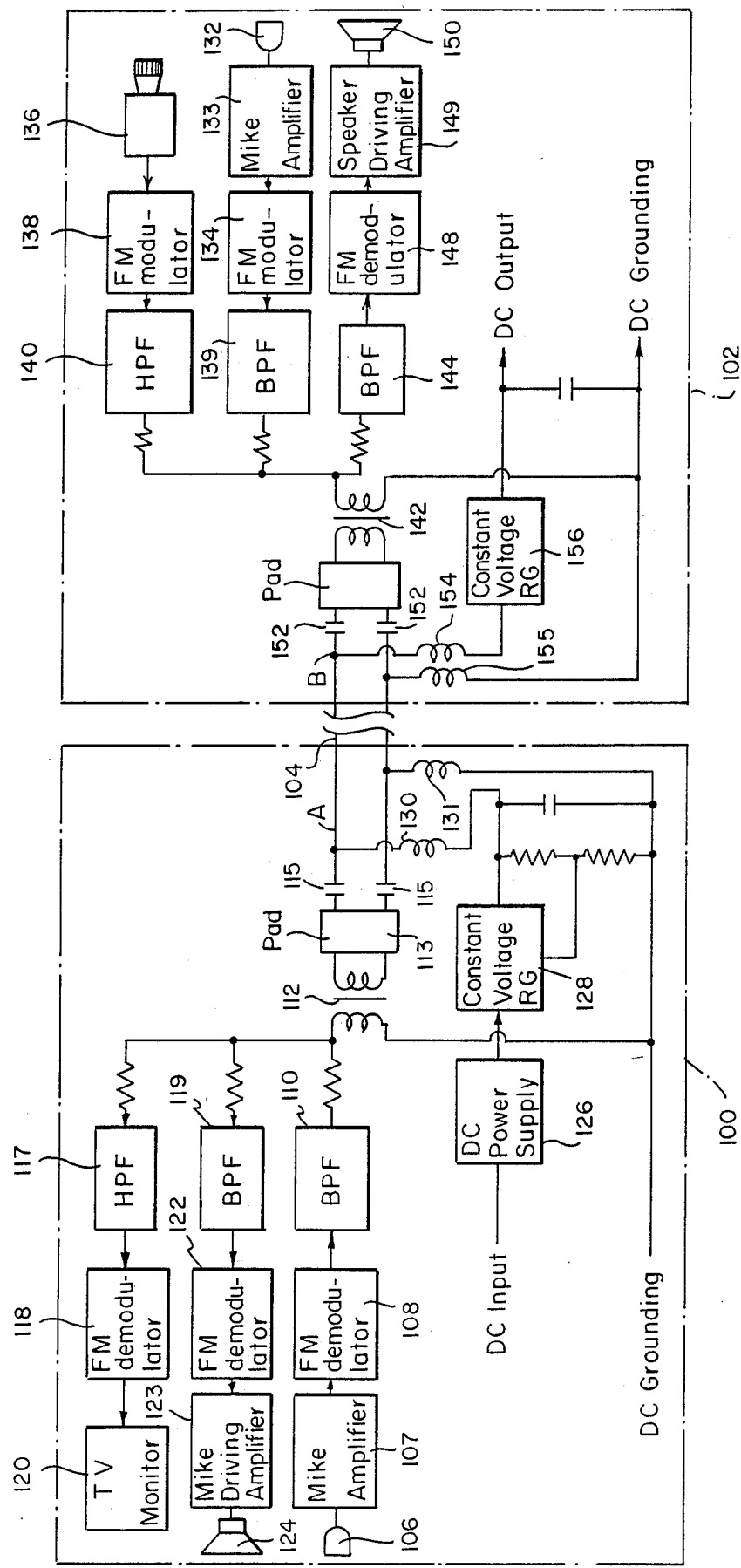
FIG. 5 is a block diagram showing the construction of the second embodiment of the present invention.
Figure 6:
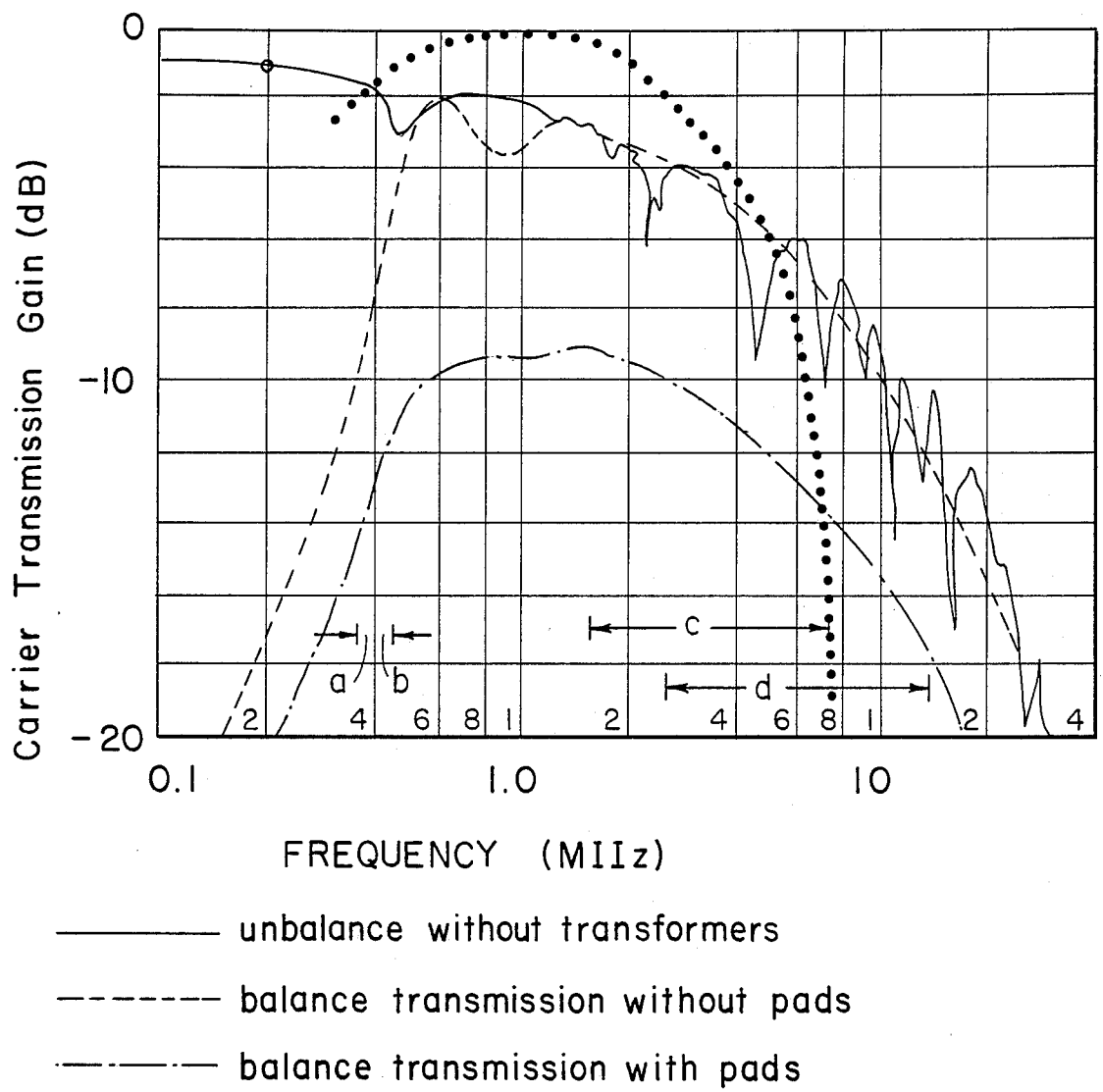
FIG. 6 shows the transmission characteristic curves of the communication cable used in the embodiment of FIG. 5.

The second embodiment of the invention which eliminates the above possible disadvantages of the first embodiment is described now with reference to FIGS. 5 and 6.

FIG. 5 shows a block diagram of a TV door phone system in which the multiplex transmission of audio/control and video carriers superposed on the DC power with the cable. Referring to FIG. 5, 100 is a indoor unit, and 102 is a outdoor unit installed at the entrance. 104 is the said cable for connection between the indoor unit 100 and the outdoor unit 102. To transmit audio/control and video carriers superposed on DC power to the outdoor unit 102, the indoor unit 100 contains a mike 106 and mike-amplifier 107 for communication with visitors facing to the outdoor unit 102, an audio frequency-modulator 108 for frequency-modulation of a carrier of about 380 kHz with an audio/control signal outputted from the mike-amplifier 107, a bandpass filter 110 (for instance, with a passband of $(380\pm20)$ kHz) to restrict the spectrum band of the audio/control carrier outputted from the audio/control frequency-modulator 108, and a line transformer 112 which not only transmits the carrier from the bandpass filter 110 via the cable to the outdoor unit 102 but also receives carriers transmitted via the cable from the outdoor unit 102.

To receive multiplex carriers composed of a carrier frequency-modulated with a video signal, that is, a video carrier and a carrier frequency-modulated with an audio/control signal, that is, an audio/control carrier transmitted from the outdoor unit 102, the indoor unit 100 further contains a video frequency-demodulator 118, a TV monitor 120 supplied by a video signal outputted from the video frequency-demodulator 118, a audio frequency-demodulator 122, a speaker 124 and a speaker-driving amplifier 123 supplied by the audio/control signal outputted from frequency-demodulator 122. After the multiplex carriers are separated by a highpass filter 117 (for instance, with cut-off frequency of about 1.5 MHz) and a bandpass filter 119 (for instance, with passband of $(420\pm20)$ KHz) into the video and the audio/control carriers, respectively, the video frequency-demodulator 118 and the audio/control frequency-demodulator 122 demodulate the carriers into the video and the audio/control signals, respectively. 115 is a DC blocking capacitor and 113 a pad for impedance matching between the line transformer 112 and the cable 104.

For a power supply block, the indoor unit 100 further contains a DC power supply 126, a constant voltage regulator 128 and a pair of power choke coils 130/131 which is the characteristic feature of the second embodiment. Each power choke coil turns into a high impedance for the audio/control carriers superposed on DC component at the power sending terminal "A".

To transmit the audio/control and the video carriers to the indoor unit 100, the outdoor unit 102 contains a mike 132 and a mike-amplifier 133 for communication with receivers facing to the indoor unit 100, a audio/control frequency-modulator 134 for frequency-modulation of the audio/control carrier of about 420 kHz with the audio signal outputted from the mike-amplifier 133, a TV camera 136 to pick up visitors, a video frequency-modulator 138 for frequency-modulation of a video carrier with the video signal outputted from the TV camera 136, a highpass filter 140 with cut-off frequency of about 1.5 MHz following the video frequency-modulator 138, a bandpass filter 139 with passband of, for instance, about (420±20) kHz following the audio/-control frequency-modulator 134 and a line transformer 142 which not only outputs the carriers to the cable but also inputs carriers from the cable.

In case of the frequency-modulation of a video carrier with a monochrome TV signal, for example, a synchronizing-pulse's tip (i.e., sync-tip) is allocated to 3.4 MHz of video carrier and a white-peak of the signal to 4.4 MHz of that as used in the video tape recorder of VHS format. And in case of such composite signal as NTSC, PAL or SECAM signal a synch-tip is allocated to 7 MHz and a white-peak to 10 MHz as used in the "highband mode" video tape recorders for the broadcasting station use.

To receive multiplex carriers sent from the indoor unit 100, the outdoor unit 102 also contains a bandpass filter 144 whose passband is (380±20) KHz for instance, an audio/control frequency-demodulator 148 for frequency-demodulation of the carrier from the bandpass filter 144, a speaker-driving amplifier 149 and a speaker 150. 152 is a DC blocking capacitor and 143 a pad for impedamce matching between the line transformer 142 and the cable 104.

The outdoor unit 102 also contains a power supply block comprising a pair of power choke coils 154/155 and a constant voltage regulator 156.

FIG. 6 shows a typical characteristic curve of the cable 104 composed of, for instance, parallel solid wires of 100 m in length and of 0.5 mm in each diameter. By "a" in FIG. 6 is indicated the allocated band of the audio/control carrier transmitted from the indoor unit 100 to the outdoor unit 102, by "b" the allocated band of the audio/control carrier transmitted from the outdoor unit 102 to the indoor unit 100, by "c" the allocated band of the video carrier of the monochrome (BW) video signal and by "d" the allocated band of the video carrier of such composite signal as NTSC, PAL or SECAM signal.

As clear from the above description, according to the second embodiment of the present invention, the power choke coils more than 100 µH (of the inherent self-resonance frequency higher than 10 MHz) turn into a high impedance for the modulated carriers of 300 kHz at least or higher frequency, compared with the cable characteristic impedance, so that it is possible to superpose DC power on the audio/control and the video carriers at the power sending terminal and to separate DC power from the multiplex carriers at the power receiving terminal. For example, supposing than an audio/control carrier of 300 kHz is modulated with an audio/control signal into a carrier band of (300± 20) kHz, the volume of 0.5 A DC-superposed choke coil which turns into 200 ohms at a frequency of (300–20) kHz, is nearly equal to 1/10000 of that at a frequency of 30 Hz which is assumed to be cut-off frequency to separate DC component from the audio/control baseband signal. Consequently, DC-superposed multiplex carriers transmission system can be compactly constructed. According to the present invention, it is not necessary to install a special cable for DC power and/or video signal transmission in addition to a cable for the audio/-control signal. Moreover, the DC power transmission system of the second embodiment of the present invention doesn't involve constant current regulators of complicated circuit-construction that have been needed in the prior art. As a result, the problem of substantial power loss generated at the constant current regulators is eliminated.

In order to construct the balanced cable transmission system a line transformer is needed at each cable-termination. In practice, a transformer has a passband in which lower cut-off frequency is determined by the inductance of the primary coil and higher cut-off frequency by the self-resonance frequency inherent in the primary/secondary coils. With the broken line is indicated a typical characteristic curve of a balanced cable transmission using line transformers at both cable termination and with the chain line, that of the 3 dB pads insertion transmission.

In the first embodiment of the invention, the voltage in the power receiving terminal may vary with the cable length because DC resistance of the cable changes with the cable length. Such inconstantness is not preferable for operation of the outdoor unit.

Figure 7:
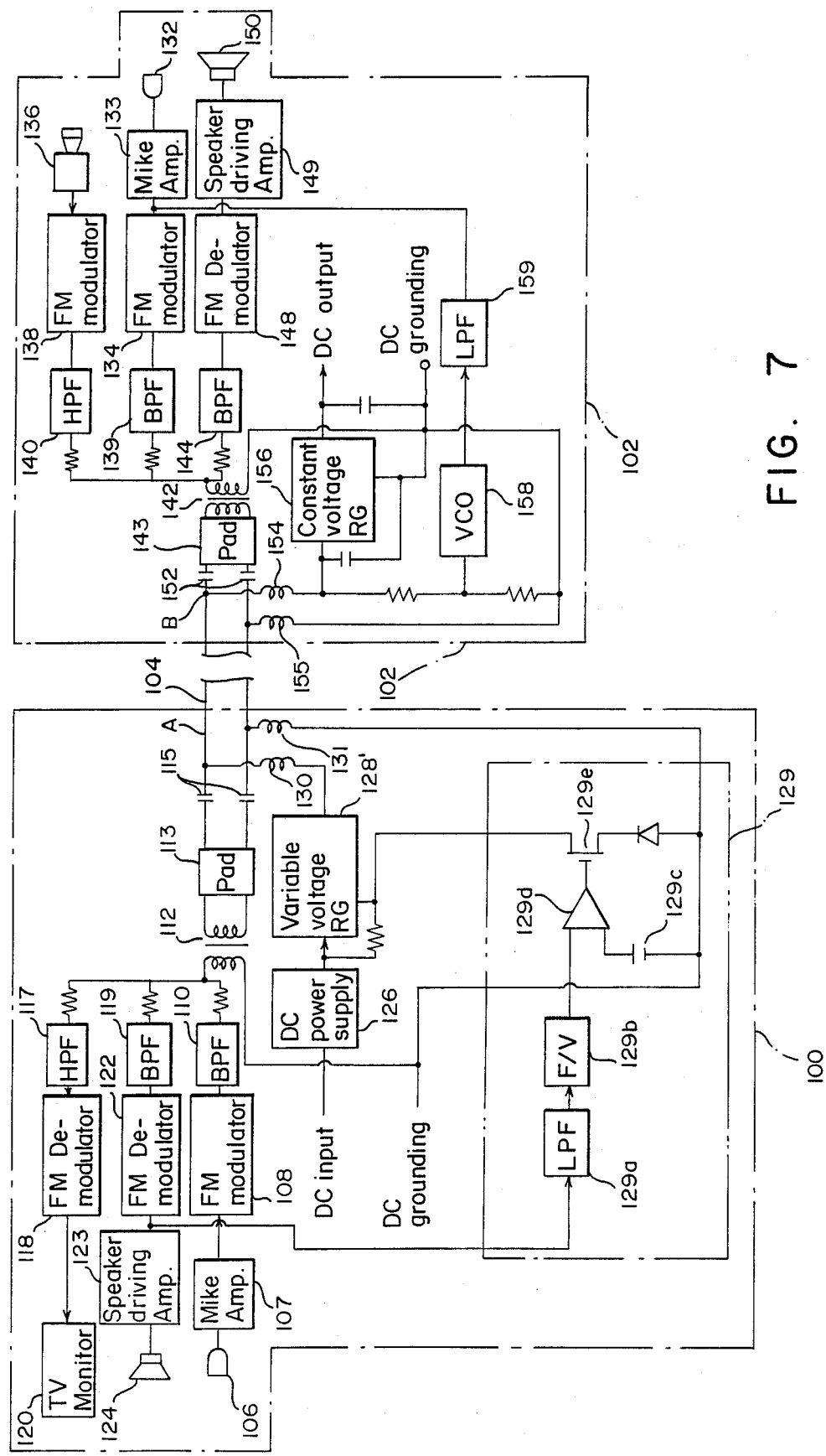
FIG. 7 is a block diagram showing the construction of the third embodiment of the present invention.

FIG. 7 shows the construction of a power transmission system of third embodiment of the present invention and the same parts as shown in FIG. 6 are allocated with the same reference numbers as in FIG. 6 and their explanation is omitted. In the third embodiment of the invention, a voltage-control regulator 128' is used in place of the constant voltage regulator 128. In addition, the indoor unit 100 contains detector means 129 for detecting DC voltage fluctuation at the receiving terminal, transmitted through the lower band of the audio/-control signal outputted from the frequency-demodulator 122.

The detector means 129 comprises a lowpass filter 129a with cutoff frequency lower than 100 Hz, a frequency-voltage (F-V) converter 129 (frequency-demodulator for control signal) for converting of the control carrier with the lowpass filter 129a hs separated from audio signal, to the "DC drop" control signal corresponding to the DC voltage drop along the cable, a differential amplifier 129d which compares the "DC drop" with a reference (supposing 0 V) 129c, and an FET transistor 129e which amplifies the output of the detector means.

The outdoor unit 102 includes a power receiving block comprising a pair of power choke coils 154/155, a constant voltage regulator 156, a voltage control oscillator 158 as frequency-modulator of a control carrier with the DC voltage drop in the cable 104, and a lowpass filter 159 with cutoff frequency lower than 100 Hz.

The DC drop voltage at the power receiving terminal is in proportion to the cable length and with that voltage the voltage control oscillator (VCO) 158 frequency-modulates a control carrier of 50 Hz and outputs the carrier through the lowpass filter 159 with cutoff frequency lower than 100 Hz to the audio/control frequency-modulator 134 which frequency-modulates an audio/control carrier with the multiplexed signal of the audio signal and the control carrier.

According to the third embodiment of the invention, the outdoor unit 100 sends the audio/control carrier to the power sending terminal on the assumption that the audio signal from the outdoor unit as a passband of about (0.3 to 3) kHz and that the control carrier has, for instance, a passband of about (50± 10) Hz.

In the power sending terminal side, the audio/control carrier is demodulated by the frequency-demodulator 122 into the audio/control signals from which the control carrier is separated by the lowpass filter 129a. The control carrier is demodulted by F/V converter 129b into the "DC drop" control signal which drives the regulator 128' to regulate for compensating the DC voltage drop at the power receiving terminal. Accordingly, DC voltage at the power receiving terminal is always kept almost constant regardless of the cable length or resistance.

In the second and third embodiments, the audio/control carriers as well as the video carrier are bidirectionally transmitted by frequency-division multiplex to avoid cross-talk. Consequently, the hybrid transformers or bidirectional amplifiers required for audio signal baseband-transmission in case of the power transmission system of the first embodiment shown in FIG. 1 are not needed in the second and third embodiments. In addition, the second and third embodiments makes difficult the howling generation which is caused by acoustic loop circuits formed by hybrid transformers, bidirectional amplifiers and/or acoustic transmission from a speaker to a mike in the indoor or outdoor unit. This permits speaker's volume to be raised up and its articulation to be improved more than the interphone system by baseband-transmission using hybrid transformers or bidirectional amplifiers.

Furthermore, according to the present invention, when a long interphone cable is installed in the area under high field-intensity of medium frequency (MF) broadcasting waves, the MF waves interference induced along the cable can be minimized by setting the audio/control carrier bands lower than the broadcast bands of (0.5 to 1.5) MHz by using line transformers 112/142.

While only certain embodiments of the present invention have been described, it will be apparent to those skilled in the art that various changes and modifications may be made therein without departing from the spirit and scope of the present invention as claimed.

What is claimed is:

1. A power transmission system for interphone apparatus comprising:
    a power sending terminal end and a power receiving terminal end connected via a communication cable,
    said power sending terminal end including means for superposing power on audio and video transmission signals generated thereat to form multiplex signals and transmitting said multiplex signals through said cable to said power receiving terminal end;
    means for separating said power from said multiplex signals at said power receiving end for powering interphone apparatus thereat;
    a first constant current regulator located at the power sending end;
    a second constant current regulator located at the power receiving end, said second regulator receiving a substantially constant current supplied through said communication cable from said first regulator and outputting therefrom a constant current of the same magnitude as the constant current from said first regulator; and
    a voltage conversion regulator coupled to said second constant current regulator for generating a constant voltage for an outdoor unit located at the power receiving end.

2. The power transmission system of claim 1, wherein said communication cable comprises a pair of PVC-coated wires.

3. The power transmission system of claim 1, wherein said multiplex transmission signals include a frequency-modulated carrier signal.

4. The power transmission system of claim 1, and further comprising:
    frequency-modulator means located at both said power sending and receiving end for frequency modulating said multiplex signals on a predetermined carrier frequency;
    frequency-demodulator means located at both the power sending and receiving ends for demodulating said multiplex signals; and
    power choke isolation coils located at both the power sending and receiving terminal ends, said coils having an inductance value for providing a high impedance at said carrier frequency compared with the characteristic impedance of said cable, whereby power superposed on said multiplex signals at said power sending terminal end is separated from said multiplex signals at said power receiving terminal end.

5. The power transmission system of claim 1, and further comprising:
    frequency generator means located at the power receiving terminal end for generating a control signal having a frequency corresponding to the voltage drop at the power receiving terminal caused by the resistance of said communication cable;
    frequency-modulator means at said power receiving terminal end for modulating a predetermined carrier frequency signal with said multiplex signals and said control signal;
    frequency-demodulator means located at said power sending end for demodulating the carrier frequency signal into the multiplex signals and the control signal transmitted through said communication cable from said frequency-modulator means at said power receiving terminal end;
    detector means coupled to said frequency-demodulator means for detecting said control signal from said frequency-demodulator means and generating a power voltage signal therefrom; and
    wherein said voltage regulator is coupled to said detector means for regulating said power voltage signal to provide a substantially constant power voltge at said power receiving end irrespective of the length of said communication cable.

6. A power transmission system for interphone apparatus comprising:
    a power sending terminal end and a power receiving terminal end connected via a communication cable,
    said power sending terminal end including means for superposing power on audio and video transmission signals generated thereat to form multiplex signals and transmitting said multiplex signals through said cable to said power receiving terminal end;
    means for separating said power from said multiplex signals at said power receiving end for powering interphone apparatus thereat;
    frequency generator means located at the power receiving terminal end for generating a control signal having means for outputting a frequency corresponding to the voltage drop at the power receiving terminal caused by the resistance of said communication cable;
    frequency-modulator means at said power receiving terminal end for modulating a predetermined carrier frequency signal with said multiplex signals and said control signal;

frequency-demodulator means located at said power sending end for demodulating the carrier frequency signal into the multiplex signals and the control signal transmitted through said communication cable from said frequency-modulator means at said power receiving terminal end;

detector means coupled to said frequency demodulator means for detecting said control signal and generating a power voltage signal therefrom; and a voltage regulator coupled to said detector means for regulating said power voltage signal to provide a substantially constant power voltage at said power receiving terminal end irrespective of the length of said communication cable.

7. The power transmission system of claim 6, wherein said communication cable comprises a pair of PVC-coated wires.

8. The power transmission system of claim 6, and further comprising:

power choke isolation coils located at both the power sending and receiving terminal ends, said coils having an inductance value for providing a high impedance at said carrier frequency compared with the characteristic impedance of said cable, whereby power superposed on said multiplex signals at said power sending terminal end is separated from said multiplex signals at said power receiving terminal end.

9. The power transmission system of claim 6, and further comprising:

a first constant current regulator located at the power sending end;

a second constant current regulator located at the power receiving end, said second regulator receiving a substantially constant current supplied through said communication cable from said first regulator and outputting therefrom a constant current of the same magnitude as the constant current from said first regulator; and wherein said voltage regulator is coupled to said second constant current regulator for generating said constant power voltage.

10. The power transmission system of claim 6, wherein said communication cable comprises a pair of parallel or twisted PVC-coated wires.

* * * * *